US012705838B2

(12) United States Patent
Xu

(10) Patent No.: US 12,705,838 B2
(45) Date of Patent: Aug. 11, 2026

(54) VIRTUAL IMAGE DISPLAYING METHOD AND APPARATUS, ELECTRONIC DEVICE AND STORAGE MEDIUM

(71) Applicant: Beijing Bytedance Network Technology Co., Ltd., Beijing (CN)

(72) Inventor: Liyou Xu, Beijing (CN)

(73) Assignee: Beijing Bytedance Network Technology Co., Ltd., Beijing (CN)

(*) Notice: Subject to any disclaimer, the term of this patent is extended or adjusted under 35 U.S.C. 154(b) by 217 days.

(21) Appl. No.: 18/044,361

(22) PCT Filed: Aug. 30, 2021

(86) PCT No.: PCT/CN2021/115432
§ 371 (c)(1),
(2) Date: Mar. 7, 2023

(87) PCT Pub. No.: WO2022/088918
PCT Pub. Date: May 5, 2022

(65) Prior Publication Data

US 2023/0360337 A1 Nov. 9, 2023

(30) Foreign Application Priority Data

Oct. 30, 2020 (CN) ......................... 202011198009.X

(51) Int. Cl.
*G06T 19/00* (2011.01)
*G06T 5/50* (2006.01)
*H04N 13/327* (2018.01)

(52) U.S. Cl.
CPC .............. *G06T 19/006* (2013.01); *G06T 5/50* (2013.01); *H04N 13/327* (2018.05); *G06T 2207/20221* (2013.01); *G06V 2201/07* (2022.01)

(58) Field of Classification Search
CPC ........ G06T 19/006; G06T 2207/20221; H04N 13/327; G06V 2201/07
See application file for complete search history.

(56) References Cited

U.S. PATENT DOCUMENTS 9,600,938 B1 3/2017 Kjallstrom et al.
2016/0267720 A1* 9/2016 Mandella ............ G06F 3/03545
(Continued)

FOREIGN PATENT DOCUMENTS

CN 103116451 A 5/2013
CN 105183477 A 12/2015
(Continued)

OTHER PUBLICATIONS

China National Intellectual Property Administration, International Search Report Issued in Application No. PCT/CN2021/115432, Nov. 2, 2021, WIPO, 15 pages.
(Continued)

*Primary Examiner* — Chante E Harrison
(74) *Attorney, Agent, or Firm* — Alleman Hall LLP

(57) ABSTRACT

Provided are a virtual image displaying method and apparatus, an electronic device, and a storage medium; by detecting a target object in a real-scene captured image captured by a terminal camera to determine a real capturing direction of the terminal camera according to a position of the target object in the real-scene captured image, calibrating, according to the real-scene capturing direction, a virtual capturing direction of a virtual camera, and performing, according to the calibrated virtual capturing direction, rendering processing on a shared virtual image corresponding to the target object to superimpose and display the processed shared virtual image on the real-scene captured image, the virtual capturing direction of the virtual camera is processed,
(Continued)

which can be more suitable for a complex virtual image to making it can be applied to more interactive scenarios.

14 Claims, 9 Drawing Sheets

(56) References Cited

U.S. PATENT DOCUMENTS

| | | | | |
|---|---|---|---|---|
| 2017/0034433 | A1 | 2/2017 | Mazzola et al. | |
| 2019/0080498 | A1* | 3/2019 | Horie | G06T 3/4053 |
| 2022/0375177 | A1* | 11/2022 | Browy | G06V 40/28 |
| 2023/0231967 | A1* | 7/2023 | Wilkinson | H04N 5/272 345/633 |

FOREIGN PATENT DOCUMENTS

| | | | | |
|---|---|---|---|---|
| CN | 106648322 A | | 5/2017 | |
| CN | 106710002 A | * | 5/2017 | |
| CN | 108022301 A | | 5/2018 | |
| CN | 110873963 A | * | 3/2020 | G02B 27/0172 |
| CN | 111818265 A | | 10/2020 | |
| CN | 112312111 A | | 2/2021 | |
| IN | 109754471 A | | 5/2019 | |
| WO | WO2017214040 A1 | | 12/2017 | |
| WO | WO2018206086 A1 | | 11/2018 | |
| WO | WO-2022040983 A1 | * | 3/2022 | |

OTHER PUBLICATIONS

China National Intellectual Property Administration, Office Action and Search Report Issued in Application No. 202011198009.X, Oct. 30, 2020, 6 pages. (Submitted with English summary).

China National Intellectual Property Administration, Notice of Rejection Issued in Application No. 202011198009.X, Sep. 9, 2022, WIPO, 3 pages.

* cited by examiner

VIRTUAL IMAGE DISPLAYING METHOD AND APPARATUS, ELECTRONIC DEVICE AND STORAGE MEDIUM

CROSS-REFERENCE TO RELATED APPLICATIONS

The present disclosure is a National Stage of International Application No. PCT/CN2021/115432, filed on Aug. 30, 2021, which claims priority to Chinese Patent Application No. 202011198009.X, filed on Oct. 30, 2020, both of the applications are hereby incorporated by reference in their entireties.

TECHNICAL FIELD

The present disclosure relates to the field of computer and in particular, to a virtual image displaying method and apparatus, an electronic device and a storage medium.

BACKGROUND

Augmented reality (Augmented Reality, AR) technology is a technology that skillfully integrates virtual information with the real world.

When using the augmented reality technology to display virtual information including a virtual image on an image captured by a terminal at a real scene, virtual camera technology needs to be combined. In the prior art, a virtual capturing direction of a virtual camera relative to a virtual image is relatively fixed. When it is necessary to rotate a display angle of the virtual image on the real-scene captured image, coordinates of the virtual image need to be processed accordingly, so that the virtual camera may display the processed virtual image. At this time, the virtual image is displayed according to the required display angle.

However, with more and more interactive manners based on the augmented reality technology, virtual images are given more information. The above displaying method of controlling virtual coordinate rotation will not be able to cope with the display of an overly complex virtual image.

SUMMARY

To solve the above problem, embodiments of the present disclosure provide a virtual image displaying method and apparatus, an electronic device and a storage medium.

In a first aspect, the present disclosure provides a virtual image displaying method, including:

- obtaining a real-scene captured image captured by a terminal camera;
- detecting a target object in the real-scene captured image;
- determining, according to a position of the target object in the real-scene image, a real capturing direction of the terminal camera;
- calibrating, according to the real capturing direction, a virtual capturing direction of a virtual camera; and
- performing, according to the calibrated virtual capturing direction, rendering processing on a shared virtual image corresponding to the target object, to superimpose and display the processed shared virtual image on the real-scene captured image.

In a second aspect, the present disclosure provides a virtual image displaying apparatus, including:

- an image capturing module, configured to obtain a real-scene captured image captured by a terminal camera;
- an image detecting module, configured to detect a target object in the real-scene captured image;
- an image processing module, configured to determine a real capturing direction of the terminal camera according to a position of the target object in the real-scene captured image; calibrate a virtual capturing direction of a virtual camera according to the real capturing direction; and perform rendering processing on a shared virtual image corresponding to the target object according to the calibrated virtual capturing direction; and an image displaying module, configured to superimpose and display the processed shared virtual image on the real-scene captured image.

In a third aspect, an embodiment of the present disclosure provides an electronic device, including at least one processor and a memory;

- where the memory stores a computer execution instruction; and
- the at least one processor executes the computer execution instruction stored in the memory to cause the at least one processor to implement the virtual image displaying method as described in the first aspect above and various possible designs of the first aspect.

In a fourth aspect, an embodiment of the present disclosure provides a computer-readable storage medium having a computer execution instruction stored thereon, where a processor, when executing the computer execution instruction, implements the virtual image displaying method as described in the first aspect above and various possible designs of the first aspect.

In a fifth aspect, an embodiment of the present disclosure provides a computer program product including a computer program, and when the computer program is executed by a processor, the virtual image displaying method as described in the first aspect above and various possible designs of the first aspect is implemented.

In a sixth aspect, an embodiment of the present disclosure provides a computer program, and when the computer program is executed by a processor, the virtual image displaying method as described in the first aspect above and various possible designs of the first aspect is implemented.

In the virtual image displaying method and apparatus, the electronic device and the storage medium provided by embodiments of the present disclosure, a target object is detected in a real-scene captured image captured by a terminal camera to determine a real capturing direction of the terminal camera according to a position of the target object in the real-scene captured image; a virtual capturing direction of a virtual camera is calibrated according to the real capturing direction; and rendering processing is performed on a shared virtual image corresponding to the target object according to the calibrated virtual capturing direction to superimpose and display the processed shared virtual image on the real-scene captured image. The virtual image displaying method provided in the embodiments does not require processing such as coordinate rotation on a virtual image per se when a display direction of the virtual image needs to be adjusted. Instead, when the virtual image is displayed, the display direction of the virtual image is adjusted by processing the virtual capturing direction of the virtual camera, and this method is more suitable for a complex virtual image, so that the virtual image can be applied to more interactive scenarios and user experience is improved.

BRIEF DESCRIPTION OF THE DRAWINGS

In order to more clearly describe the technical solution in embodiments of the present disclosure or the prior art, in the following, the drawings that need to be used in the description of the embodiments or the prior art will be briefly introduced. Apparently, the drawings in the following description are a part of embodiments of the present disclosure. For persons of ordinary skill in the art, other drawings may also be obtained based on these drawings without paying creative labor.

DESCRIPTION OF EMBODIMENTS

Figure 1:
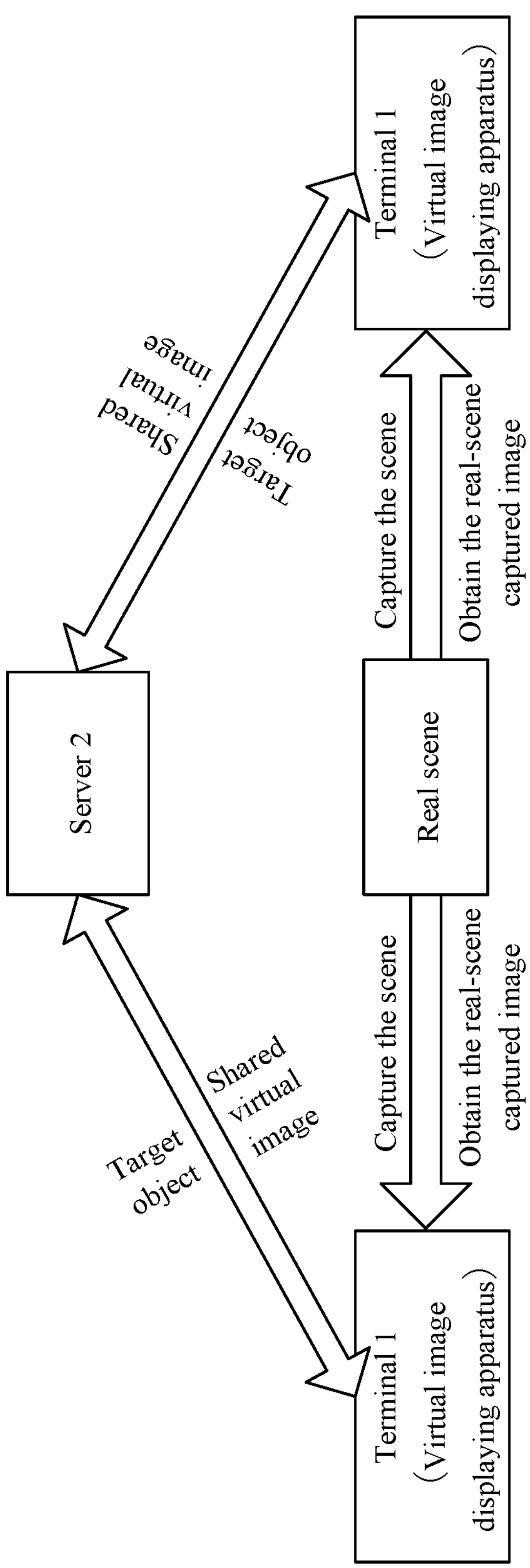
FIG. 1 is a schematic diagram of a network architecture on which the present disclosure is based.

In order to make the purpose, the technical solution, and the advantage of embodiments of the present disclosure clearer, the technical solution in embodiments of the present disclosure will be clearly and completely described below with reference to the accompanying drawings. Apparently, the described embodiments are merely a part rather than all embodiments of the present disclosure. All other embodiments obtained by persons of ordinary skill in the art based on embodiments in the present disclosure without paying creative labor shall fall within the protection scope of the present disclosure.

Augmented reality (Augmented Reality, AR) technology is a technology that skillfully integrates virtual information with the real world.

During the display of augmented reality, a terminal will first capture a real scene of a real-world scene to obtain a captured image of the current real scene. Then, the augmented reality technology is used to process the real-scene captured image, so as to superimpose information including a virtual image on the real-scene captured image, and present the superimposed image to a user.

Generally speaking, when using the augmented reality technology to display virtual information including a virtual image on a real-scene captured image of a terminal, virtual camera technology needs to be combined.

When the terminal obtains the virtual image which needs to be displayed, it may call a virtual camera to render the virtual image. In some cases, in order to achieve a better virtual image display effect in the augmented reality technology, the virtual image may change its display angle of view with the change of a capturing angle of view of a real-scene camera.

In the prior art, the following method is generally adopted: first, determining a change of a capturing angle of view of a real camera, and changing virtual coordinates of the virtual image in the virtual coordinate system accordingly based on a change of the angle of view to shift and rotate a position of the virtual image in the virtual coordinate system. After that, the virtual image is rendered with the virtual camera to obtain an image, which is an image with a change of a display angle of view according to the change of the capturing angle of the real camera.

However, with more and more interactive manners based on the augmented reality technology, virtual images are given more information. For example, with an application of multi person interaction in the augmented reality technology, virtual characters or virtual avatars of different users may be displayed in a same virtual image. When positions of these virtual characters or virtual avatars change based on the control of the users, an existing manner adopted is to process the coordinates of the virtual image to change the display angle, which makes the processing of the virtual image more complex. Moreover, over complex coordinate change brings difficulties in processing efficiency to the display processing of the virtual image, which makes the display of the virtual image prone to be stuck and make the display effect poor.

Regarding such a problem, according to an embodiment of the present disclosure, a virtual capturing direction of a virtual camera is changed, so that when the virtual camera renders a virtual image, the rendering can be directly performed based on an adjusted virtual capturing direction, and then the rendered virtual image is presented with a virtual image for which the display direction has been adjusted, thereby solving the aforementioned problem. Furthermore, this way may be more suitable for a complex virtual image, so that the virtual image can be used in more interactive scenarios, and the processing efficiency and display effect can be effectively improved.

Referring to FIG. 1, FIG. 1 is a schematic diagram of network architecture based on the present disclosure. Specifically, the network architecture shown in FIG. 1 may include at least one terminal 1 and a server 2.

Among them, the terminal 1 may specifically be a user mobile phone, a smart home device, a tablet computer, a wearable device and other hardware devices that may be used to capture real scenes and display the captured real scenes. The terminal 1 may be integrated with or installed with a virtual image displaying apparatus. The displaying apparatus is hardware or software used to implement the virtual image displaying method disclosed in the present disclosure. The virtual image displaying apparatus may provide the terminal 1 with a display page for augmented reality display. In addition, the terminal 1 uses its screen or display component to display, to the user, a display page for augmented reality display provided by the virtual image displaying apparatus.

Specifically, the server 2 may be a server or a server cluster in the cloud, and various data of shared virtual images related to the virtual image displaying method provided by the present disclosure may be stored in the server or the server cluster.

Specifically, when performing the virtual image displaying method provided by the present disclosure, the display apparatus may also use a network component of the terminal 1 to interact with the server 2, to acquire various data of shared virtual images stored in the server 2, and perform corresponding processing and display.

The architecture shown in FIG. 1 may be applied to the field of information presentation, or in other words, it may be used for information presentation in various scenarios.

For example, the virtual image displaying method provided by the present disclosure may be applied to a game interaction scenario which is based on augmented reality display. For example, in some "battle" games based on the augmented reality display technology, a situation of a virtual character of a player in the battle scene may be pushed and presented in the process of "battle" through the virtual image displaying method provided by the present disclosure.

For another example, in some public places, such as, a landmark building, a museum, a concert and the like, which may be combined with the augmented reality display technology, multiple people use their respective terminals to trigger acquisitions of a shared virtual image, and use the virtual image displaying method provided by the present disclosure to display the shared virtual image at their respective terminals, and may also conduct image interaction or text interaction between multiple terminals via the shared virtual images to achieve user interaction in the process of tourism, visiting exhibitions and watching concerts.

In addition, in some life scenarios of offline parties, the virtual image display provided by the present disclosure may also be combined with common entertainment manners, such as, a table game, a poker game, to provide users with more and richer interactive experience, which is conducive to improving user experience.

Figure 2:
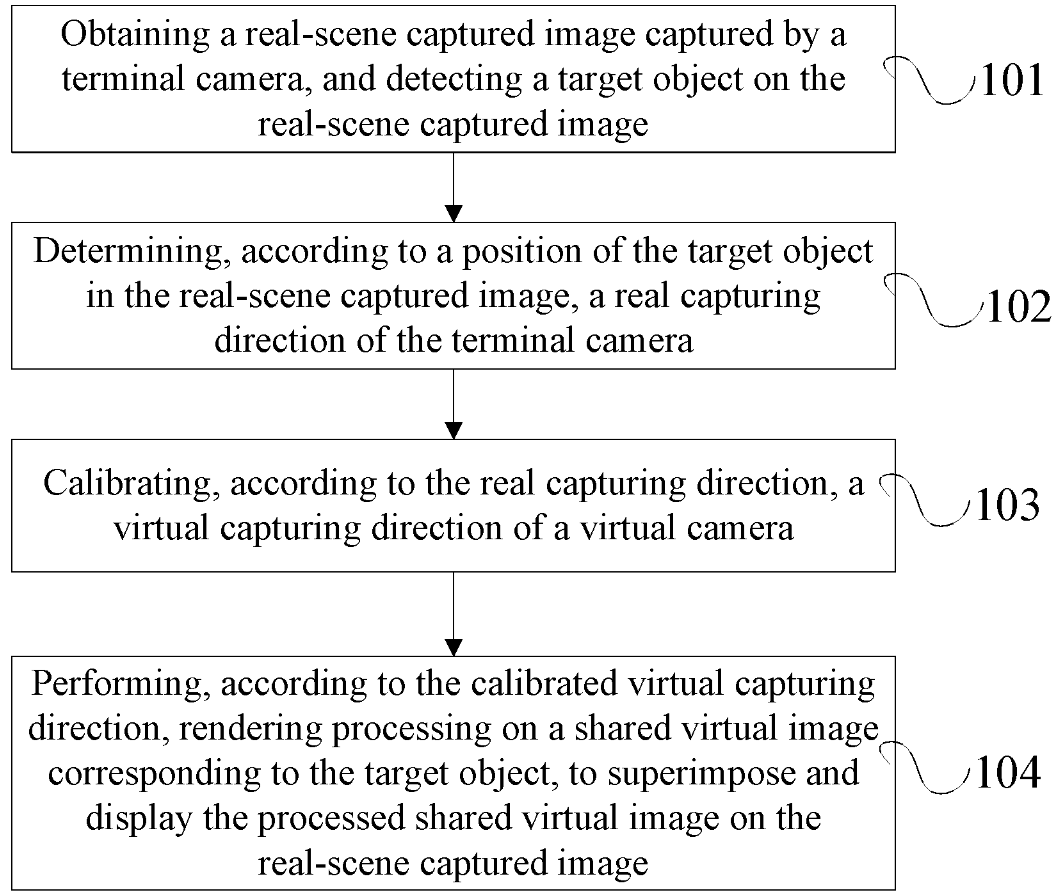
FIG. 2 is a flow diagram of a virtual image displaying method provided by an embodiment of the present disclosure.

The following will further explain the virtual image displaying method provided by the present disclosure:

In a first aspect, FIG. 2 is a flow diagram of a virtual image displaying method provided by an embodiment of the present disclosure. Referring to FIG. 2, the virtual image displaying method provided by the embodiment of the present disclosure includes:

- step 101: obtaining a real-scene captured image captured by a terminal camera, and detecting a target object in the real-scene captured image;
- step 102, determining, according to a position of the target object in the real-scene captured image, a real capturing direction of the terminal camera;
- step 103, calibrating, according to the real capturing direction, a virtual capturing direction of a virtual camera; and
- step 104: performing, according to the calibrated virtual capturing direction, rendering processing on a shared virtual image corresponding to the target object, to superimpose and display the processed shared virtual image on the real-scene captured image.

It should be noted that an execution subject of the virtual image displaying method provided by this embodiment is the aforementioned virtual image displaying apparatus. In some embodiments of this disclosure, it specifically refers to a client or a display terminal that may be installed or integrated on the terminal. A user may operate the displaying apparatus through the terminal to make the displaying apparatus respond to an operation triggered by the user.

Figure 3A:
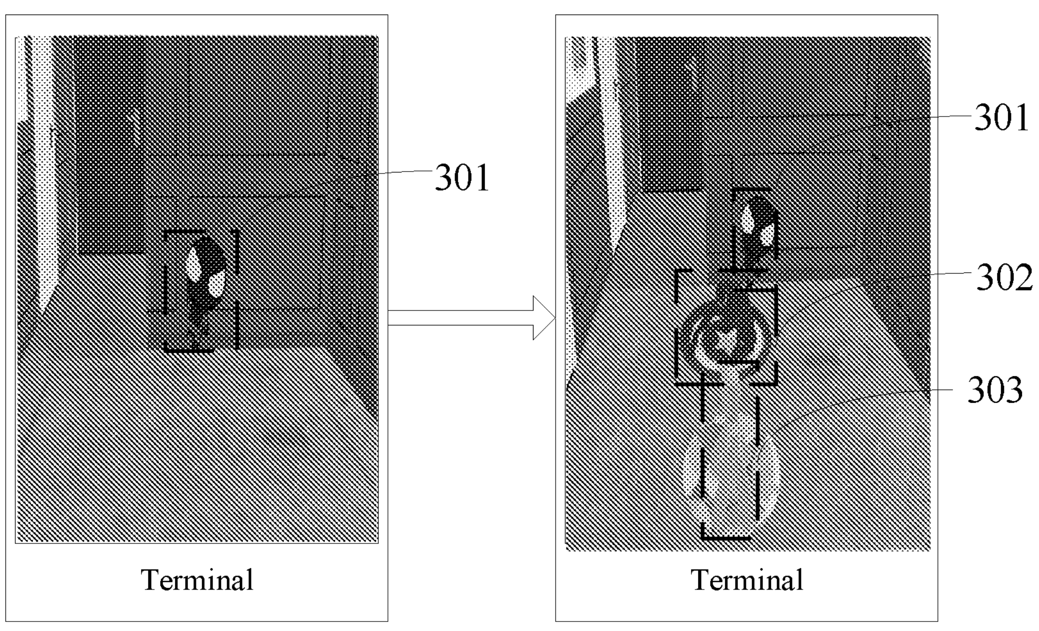
FIG. 3*a* is a schematic diagram of change of a first interface of a virtual image displaying method provided by an embodiment of the present disclosure.
Figure 3B:
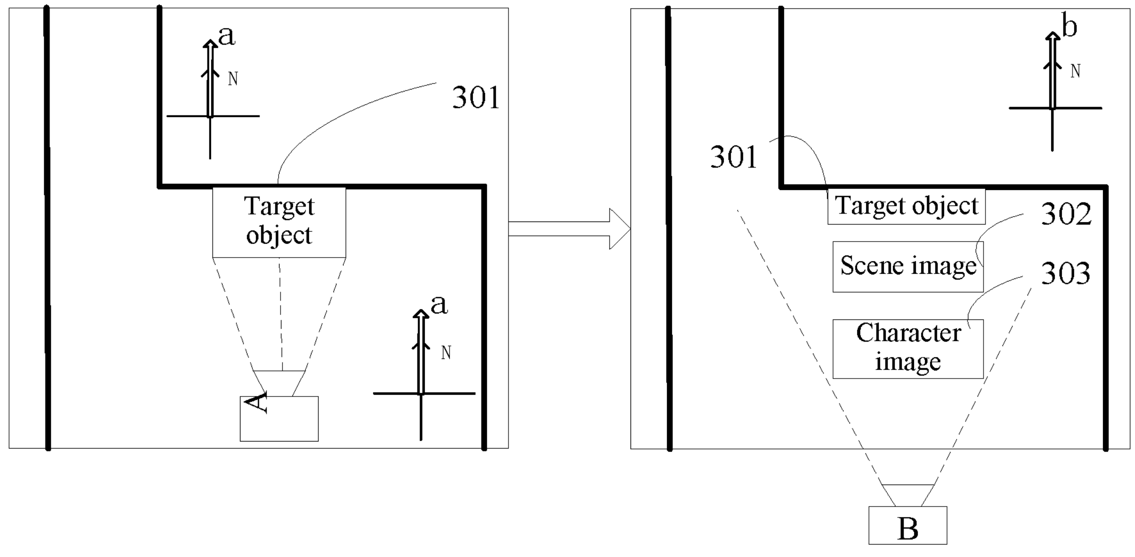
FIG. 3*b* is a schematic diagram in a top-down view of a terminal camera A and a virtual camera B in the scene corresponding to FIG. 3*a*.

FIG. 3*a* is a schematic diagram of change of a first interface of a virtual image displaying method provided by an embodiment of the present disclosure; and FIG. 3*b* is a schematic diagram in a top-down view of a terminal camera A and a virtual camera B in the scenario corresponding to FIG. 3*a*.

First, as shown in FIG. 3*a*, the virtual image displaying apparatus of the terminal may obtain a real-scene captured image, which may be an image obtained by the terminal through calling its own capturing component, that is, the terminal camera, to capture the current environment.

The virtual image displaying apparatus may perform image recognition on the real-scene captured image to determine whether there is a target object 301 in the real-scene captured image.

It should be understood that the virtual image displaying apparatus may recognize the target object 301 in the real-scene captured image through the image recognition technology. In an embodiment, the target object may be a two-dimensional plane image, such as, a picture with a specific pattern, or a two-dimensional code picture. In an embodiment, the target object may also be an image of a three-dimensional object, such as a landmark building or various three-dimensional objects. The image recognition technology according to the embodiments of the present disclosure may be implemented based on the two-dimensional image recognition technology, that is, image recognition may be performed for a planar picture including a preset planar picture, a projection surface of a three-dimensional object, and a planar picture that has a certain deformation by using the image recognition technology. In addition, when the target object includes an image of a three-dimensional object, embodiments of the present disclosure may be implemented by adopting the object recognition technology. The present disclosure does not restrict specific image recognition techniques.

By performing image recognition on the real-scene captured image, the virtual image displaying apparatus may detect, in the real-scene captured image, the target object and the position of the target object in the real-scene captured image, such as, an image of the target object 301 located on a wall surface as shown in the left figure of FIG. 3*a*. When the target object is a two-dimensional planar image, the position of the target object in the real-scene captured image is a position of the two-dimensional planar image; while when the target object is an image of a three-dimensional object, a corresponding display position may be a projection position of the three-dimensional object projected on a two-dimensional plane.

The real capturing direction of the terminal camera may be determined by using the position of the target object in the real-scene captured image. As shown in the left figure of FIG. 3*b*, the real capturing direction a of the terminal camera A may be obtained by analyzing the real-scene captured image in FIG. 3*a*, where the real capturing direction a may be a direction vector in a real world coordinate system. Therefore, the real capturing direction may be used to represent phase information, such as, a relative distance, a relative angle, of the target object relative to the terminal camera A.

Then, as shown in the right figure of FIG. 3*a* and the right figure of FIG. 3*b*, the displaying apparatus may calibrate a virtual capturing direction b of the virtual camera B according to the real capturing direction, so that the calibrated virtual capturing direction b is consistent with the real capturing direction a. The displaying apparatus may perform rendering processing on the shared virtual image corresponding to the target object 301 by using the calibrated virtual capturing direction b, and superimpose and display the processed shared virtual image on the real-scene captured image. In the right figure of FIG. 3*a* and the right figure of FIG. 3*b*, the shared virtual image displayed on the real-scene captured image may include a corresponding scene image 302 of the target object 301 and a character image 303, where reference may be made to the following embodiments for a specific acquisition manner for the scene image 302 and the character image 303.

Figure 3C:
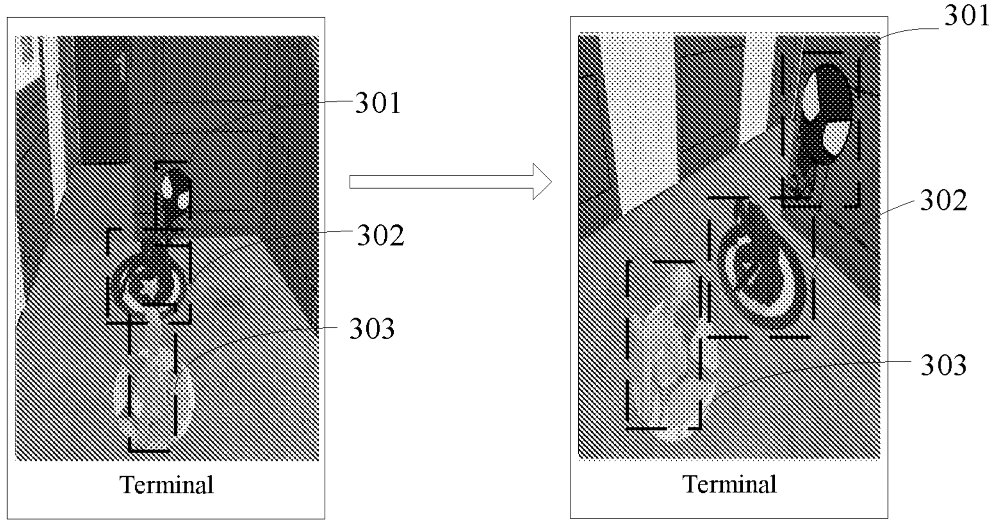
FIG. 3*c* is a schematic diagram of change of a second interface of a virtual image displaying method provided by an embodiment of the present disclosure.
Figure 3D:
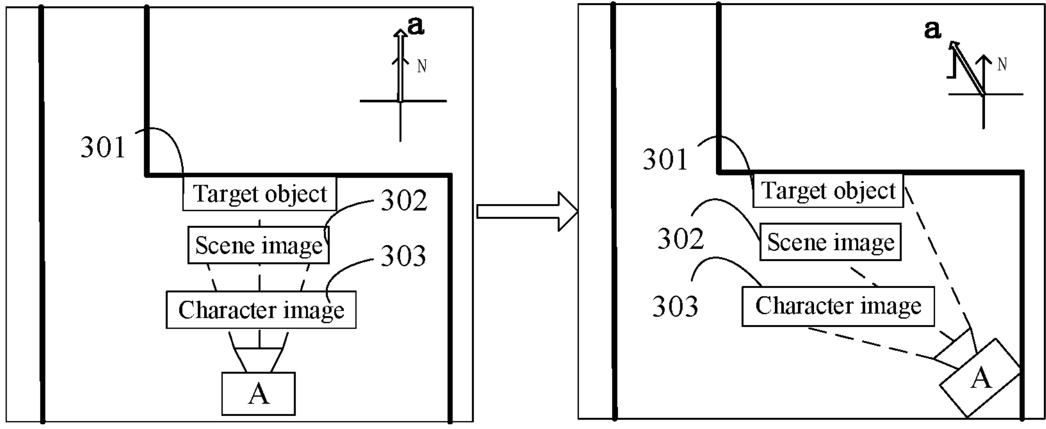
FIG. 3*d* is a schematic diagram of change in a top-down view of a terminal camera Ain the scene corresponding to FIG. 3*c*.

In the above process, the position of the terminal camera A may change due to a movement of the user. At this time, the real capturing direction a of the terminal camera A will also change. Specifically, FIG. 3*c* is a schematic diagram of change of a second interface of a virtual image displaying method provided by an embodiment of the present disclosure; FIG. 3*d* is a schematic diagram of change in a top-down view of the terminal camera A in the scene corresponding to FIG. 3*c*; and FIG. 3*e* is a schematic diagram of change in a top-down view of the virtual camera B in the scene corresponding to FIG. 3*c*.

Figure 3E:
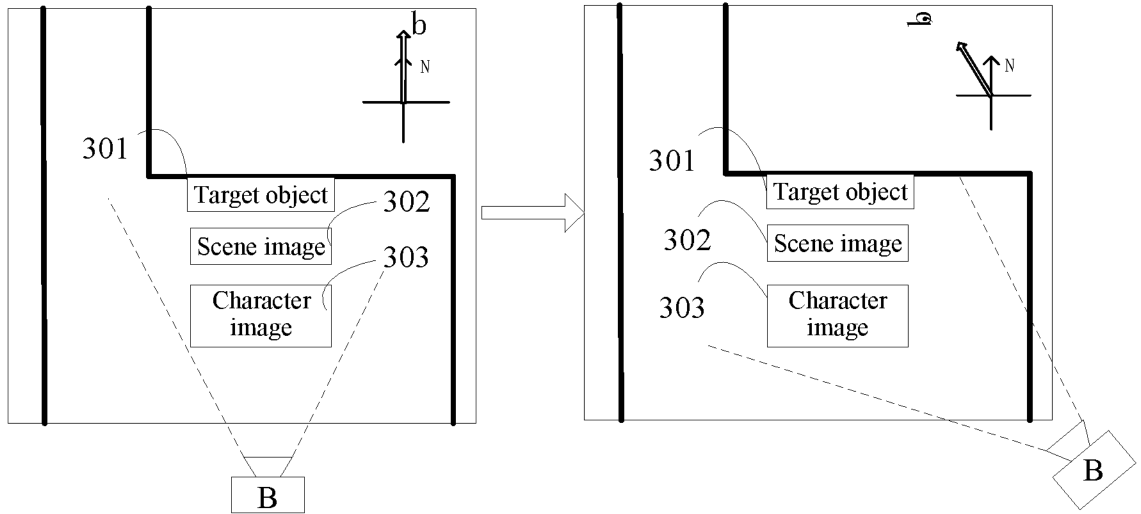
FIG. 3*e* is a schematic diagram of change in a top-down view of a virtual camera B in the scene corresponding to FIG. 3*c*.

Referring to FIGS. 3*c*-3*e*, first, as shown in the left figure of FIG. 3*c*, the left figure of FIG. 3*d*, and the left figure of FIG. 3*e*, the real capturing direction a of the terminal camera A may be determined according to the target object 301 in the real captured image, and the virtual capturing direction b may be obtained by direction calibration on the virtual camera B, and the shared virtual image (such as the scene image 302 and the character image 303) is rendered by using the virtual camera B configured with the virtual capturing direction b to obtain a superposed image (as shown in the left figure of FIG. 3*c*).

However, when the user moves, the position of the terminal camera A may change. At this time, it is determined that the real capturing direction of the terminal camera A becomes a' according to the target object 301 in the real captured image, and using the new real capturing direction of a', the virtual camera B will be calibrated again to obtain its virtual capturing direction b', and the shared virtual image (such as the scene image 302 and the character image 303) is rendered again by using the virtual camera B configured with the virtual capturing direction b' to obtain a superimposed image (as shown in the right figure of FIG. 3*c*).

Furthermore, in the above process, in order to enable the display angle of view of the shared virtual image to change with the change of the capturing direction of the terminal camera, as previously described, different from the prior art, the virtual capturing direction of the virtual camera will be calibrated by using the real capturing direction of the terminal camera in the present disclosure.

The calibration process will be further described below.

When determining the real capturing direction of the terminal camera according to the position of the target object in the real-scene captured image, a current phase angle of the target object relative to the terminal camera may be determined according to the position of the target object in the real-scene captured image.

Specifically, in an example, the displaying apparatus may determine a distance and a direction of the target object in a real scene relative to the terminal camera according to the position of the target object in the real-scene captured image through an image detection algorithm, so as to obtain the current phase angle.

Furthermore, in implementation, a depth of field of the target object in the real-scene captured image may be determined, which may be used to represent a distance of the target object relative to the terminal camera, and in combination with the position of the target object in the real-scene image, a direction of the target object relative to the terminal camera may be determined, so as to obtain the current phase angle used to represent the distance and the direction of the target object relative to the terminal camera.

For example, when the displaying apparatus determines the depth of field of the target object in the real-scene captured image, a method of capturing from multiple angles may be adopted for implementation, that is, the real-scene captured images of the target object captured in the real scene from multiple angles are obtained through capturing to determine the depth of field of the target object in the real-scene captured image; alternatively, using a spatial image distance measurement technology or a depth measurement function of the terminal camera to directly determine the depth of field of the target object in the real-scene captured image. In addition, an image detection algorithm may be run to obtain the current phase angle of the distance and the direction of the target object relative to the terminal camera.

Accordingly, the virtual capturing direction of the virtual camera may also be a phase angle of the virtual camera.

That is, after determining the current phase angle of the terminal camera, the displaying apparatus may calibrate, according to the current phase angle of the terminal camera, a phase angle of the virtual camera to obtain a calibrated phase angle of the virtual camera; and then, perform rendering processing on the shared virtual image according to the calibrated phase angle of the virtual camera.

In an embodiment, in order to make the display angle of the rendered shared virtual image meet the requirements, the phase angle of the virtual camera is consistent with the current phase angle of the terminal camera.

Furthermore, the calibration process may be realized by using a matrix, for example, by the following steps:

when calibrating the virtual camera, the displaying apparatus may first determine an offset matrix according to the current phase angle of the terminal camera, where the offset matrix may record a phase change of the target object relative to an initial phase angle of the terminal camera. Then, the displaying apparatus performs inverse transformation on the offset matrix to obtain an inverse transformation matrix. Finally, the initial phase angle of the virtual camera is processed by using the inverse transformation matrix to obtain the calibrated phase angle of the virtual camera.

The initial phase angle of the terminal camera and the initial phase angle of the virtual camera refer to phase angles of the terminal camera and the virtual camera when the terminal camera starts and detects the target object in the real-scene captured image (i.e., the initial time).

This embodiment may use the offset matrix to record the phase change of the target object relative to the initial phase angle of the terminal camera, and then derive a phase change between the initial phase angle of the virtual camera and the calibrated phase angle through such phase change, so as to achieve the phase angle calibration of the virtual camera, and ensure that the shared virtual image is rendered using the calibrated phase angle of the virtual camera, and thus, the shared virtual image is transformed and displayed in a manner of transforming the shared virtual image using the same visual angle and distance as the target object relative to the terminal camera.

On the basis of the above embodiments, this embodiment will further include an acquisition process of the shared virtual image. That is, before performing rendering processing on the shared virtual image corresponding to the target object according to the calibrated virtual capturing direction, this embodiment further includes: obtaining the shared virtual image corresponding to the target object.

Figure 4:
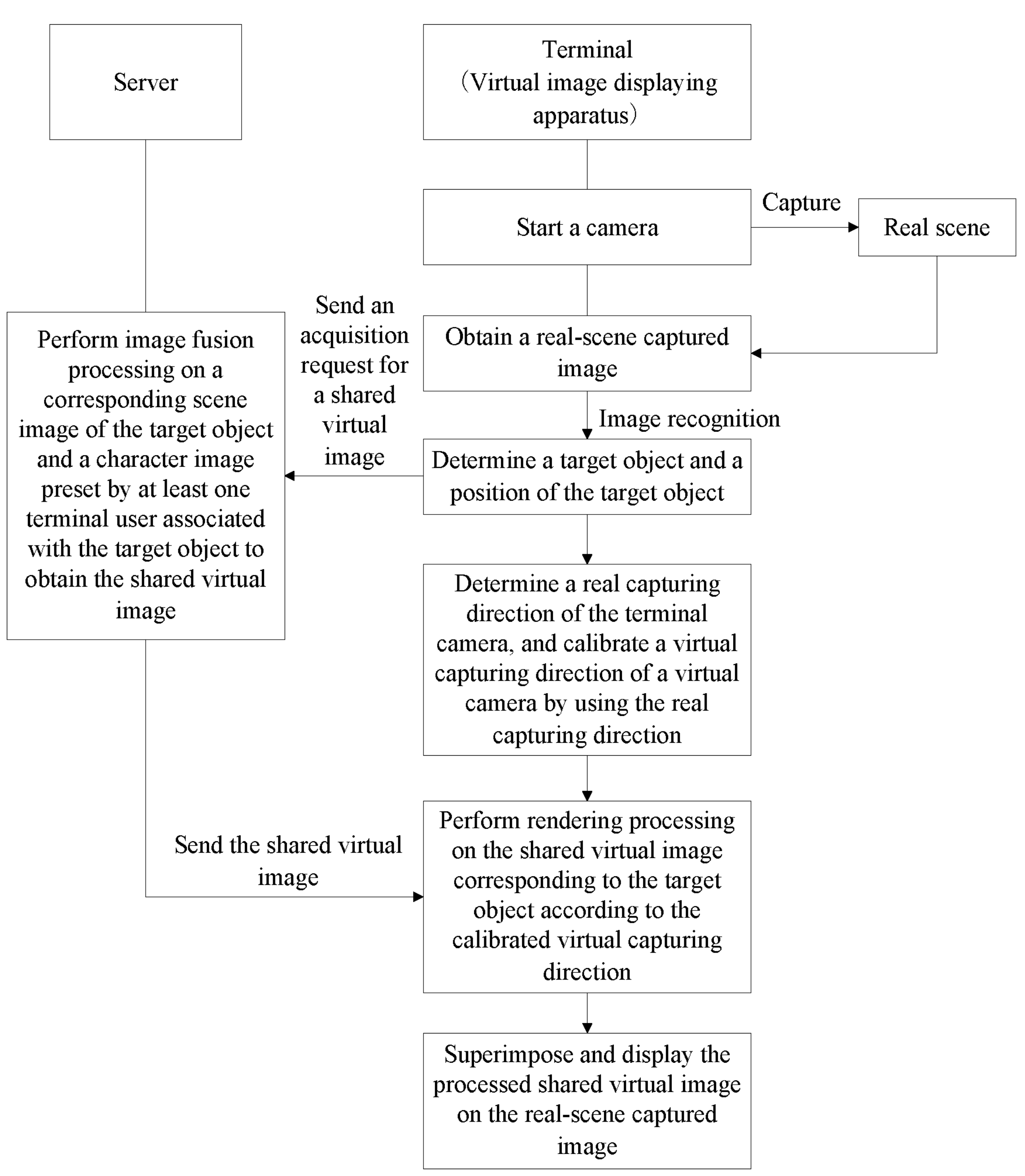
FIG. 4 is a signaling interaction diagram of a virtual image displaying method provided by an embodiment of the present disclosure.

FIG. 4 is a signaling interaction diagram of a virtual image displaying method provided by an embodiment of the present disclosure.

Specifically, as shown in FIG. 4, first, the terminal will start a camera to capture a real scene to obtain a real-scene captured image. Then, the terminal will perform image recognition on the real-scene captured image to obtain a target object therein and a position of the target object in the real-scene captured image.

Then, the terminal may perform two processes at the same time: one is as described previously, determining the real capturing direction of the terminal camera according to the position of the target object in the real-scene captured image, and calibrating the virtual capturing direction of the virtual camera by using the real capturing direction; while the other one is the process of acquiring the shared virtual image corresponding to the target object, which may include the following steps: sending an acquisition request for the shared virtual image to the server, and receiving the shared virtual image delivered by the server.

In the process of acquiring the shared virtual image corresponding to the target object, it is known that the acquisition request, sent to the server, for the shared virtual image may include the detected target object. Of course, the target object in the acquisition request may specifically include an identification of the target object obtained by decoding the image of the target object, or data of the target object, such as, code of the target object, obtained through performing image encoding processing on the target object, of which type and acquisition method are not limited in the present disclosure.

After acquiring the target object, the server may retrieve, from a database of the server, a scene image corresponding to the target object and a character image preset by at least one terminal user associated with the target object; then, the server may perform image fusion processing on the scene image and the character image preset by the at least one terminal user associated with the target object, to fuse these images into a same image to obtain a fused image, which is the shared virtual image. The server may send the fused shared virtual image to the terminal for processing.

The character image preset by the terminal user refers to the character image established by the terminal user when the terminal user first connects with the server, which may be either a "puppy" image 303 as shown in FIG. 3*a* or other types of character images. Of course, in another embodiment, the terminal user may establish a connection with the server at any time to reconfigure relevant attribute information of the character image preset in the server. For example, the terminal user may reconfigure a shape attribute, a size attribute, even a voice dubbing attribute and a personalized action attribute of the character image, so that the character image may better reflect a user personality of the terminal user.

Then, the terminal renders the shared virtual image corresponding to the target object according to the calibrated virtual capturing direction, to superimpose and display the processed shared virtual image on the real-scene captured image.

In the above process, in an implementation, the at least one terminal user associated with the target object may be a user of a terminal which has detected the same target object in a same time period or in a same geographical location range.

For example, when the target object is "Tower A" of a tourist attraction, if a certain terminal user triggers a camera and detects the target object "Tower A", at this time, the terminal user may send an acquisition request for a shared virtual image including "Tower A" to a server and receive the shared virtual image returned by the server, where the shared virtual image may include (1) a scene image of "Tower A" with special effect; (2) a character image preset by the terminal user, such as, an account avatar, and/or, a preset virtual pet image, etc.; (3) a character image of the user of another terminal which detects "Tower A" in a same time period or in a same geographical location range, such as, an account avatar, and/or a preset virtual pet image.

Of course, in order to meet a social requirement of user, at this time, the terminal user may conduct a social interaction with users of other terminals which have detected "Tower A", and further may conduct a character modification, a character operation and other interactions on the character image of the terminal user per se, to meet the requirement of user.

In the process of interaction using the displaying method, the displaying apparatus may receive an control operation triggered by the user on a corresponding character image displayed on the real-scene captured image, and upload the control operation to the server, for the server to update the corresponding character image in the shared virtual image according to the control operation to obtain an updated shared virtual image; and then, receive the updated shared virtual image delivered by the server, and perform rendering processing on the updated shared virtual image to superimpose and display the updated shared virtual image on the real-scene captured image.

In other words, the above method may ensure that the control operation and a result of the control operation may be fed back to the terminal in real time for display.

In the above process, in order to further improve the display processing efficiency, when the server fuses the shared virtual image, it may fuse coordinates of the corresponding scene image of the target object and the character image pre-stored by the at least one terminal user associated with the target object, so that coordinate systems of the respective images are a same virtual coordinate system.

Therefore, after receiving the scene image and the respective character images established in the same virtual coordinate system, the terminal may directly perform corresponding spatial rendering on spatial coordinates of the shared virtual image in the virtual coordinate system according to the calibrated virtual capturing direction.

In order to ensure the processing efficiency of the displaying apparatus of the terminal on the shared virtual image, in other examples, a number of terminals that associates with the target object may also be controlled, so that among all associated terminals that detect the target object, only a character image of a terminal that meets a preset condition is fused into the shared virtual image by the server for display, where the preset condition may be related to a geographical location.

In an implementation, the acquisition request, sent to the server, for the shared virtual image further includes a current geographical location, that is, the current geographical location of the terminal.

After receiving the current geographical location, the server may retrieve a geographical location sharing range corresponding to the target object and determine whether the current geographical location belongs to the geographical location sharing range. If it is determined that the current geographical location belongs to the geographical location sharing range, the server delivers the fused shared virtual image to the terminal; if it is determined that the current geographical location does not belong to the geographical location sharing range, the server delivers a message of acquisition request failure to the terminal.

Here, the geographical location sharing range corresponding to the target object may be determined based on a geographical location of a terminal which detects the target object first.

Figure 5:
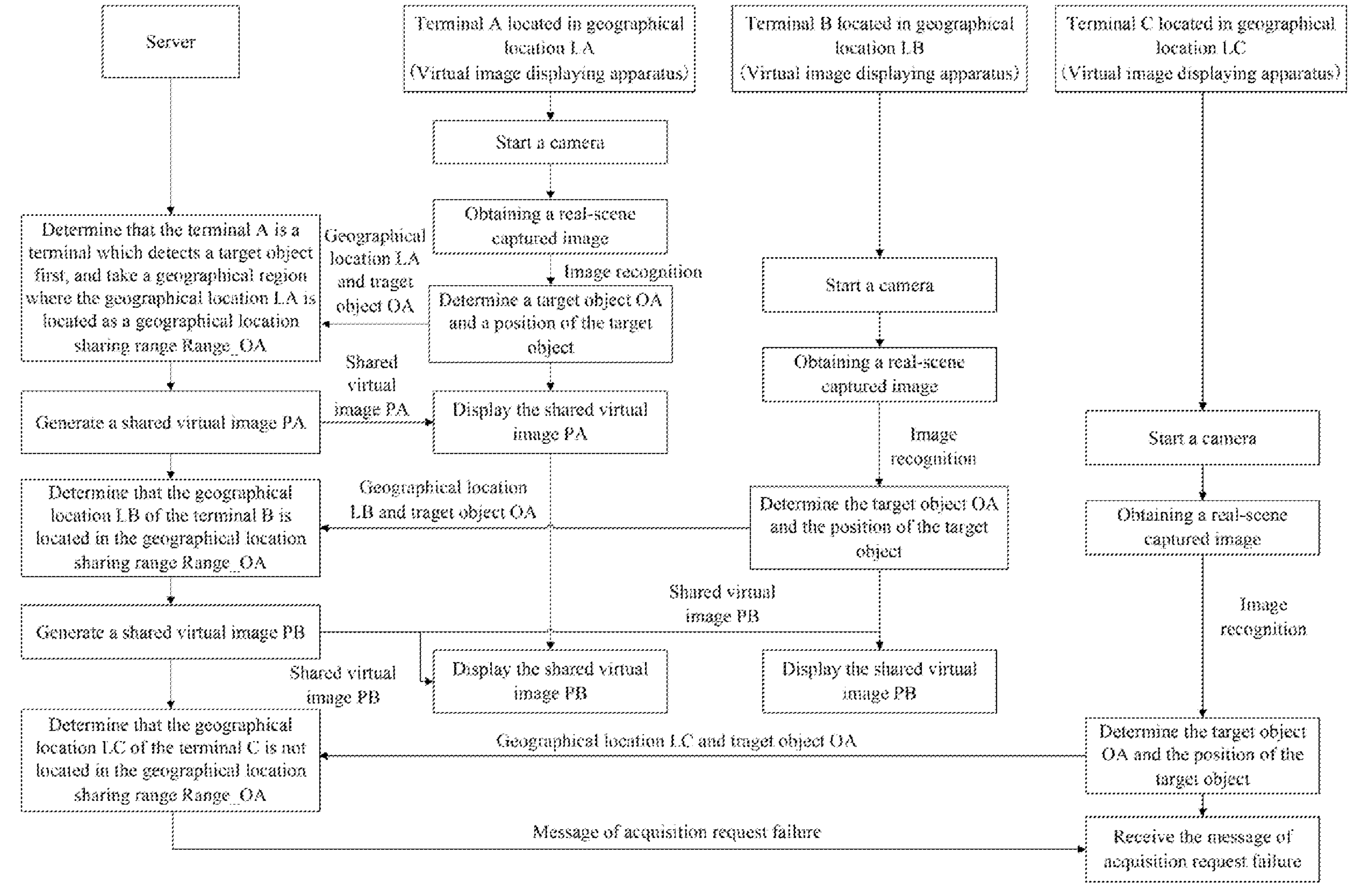
FIG. 5 is a signaling interaction diagram of another virtual image displaying method provided by an embodiment of the present disclosure.
Figure 6:
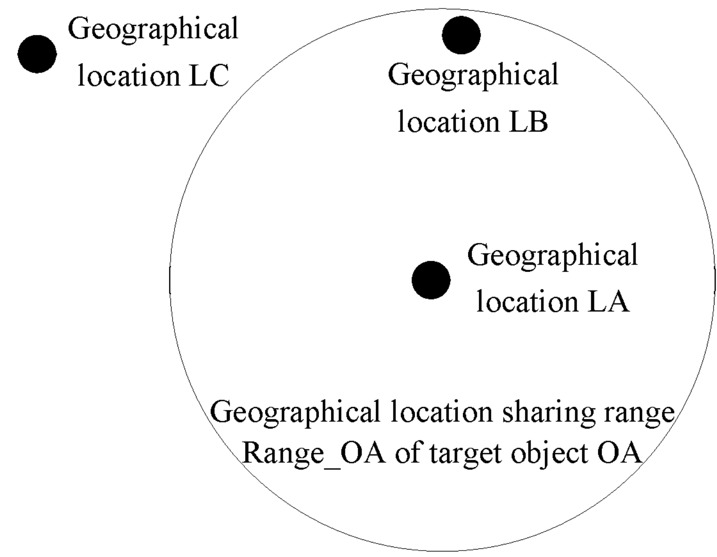
FIG. 6 is a schematic diagram of another scene provided by an embodiment of the present disclosure.

Taking a game interaction scenario based on augmented reality display as an example, FIG. 5 is a signaling interaction diagram of another virtual image displaying method provided by an embodiment of the present disclosure; and FIG. 6 is a schematic diagram of another scene provided by an embodiment of the present disclosure.

As shown in FIG. 5 and FIG. 6, a terminal A starts real-scene capturing at a geographical location LA, and detects a target object OA in the real-scene captured image. At moment T1, the terminal A may send the target object OA and the geographical location LA to a server. The server may determine that the terminal A is a terminal which detects the target object first, and at this time, the server takes a geographical region where the geographical location LA is located (for example, a circular region with the geographical location LA as an origin and a preset distance as a radius) as the geographical location sharing range Range_OA corresponding to the target object The server obtains a shared virtual image PA after fusing the respective images (a scene image of the target object, a character image of the terminal A), and returns the shared virtual image PA to the terminal A for display.

Then, at moment T1+t1, another terminal B starts real-scene capturing at a geographical location LB, and detects the target object OA in a real-scene captured image. At this time, the terminal B may send the target object OA and the geographical location LB to the server. The server may determine that the terminal B is not the terminal which detects the target object first. Then, the server knows that the geographical location sharing range Range_OA of the target object OA is the geographical region where the geographical location LA is located. At this time, the server may determine whether the geographical location LB is located in the geographical region (that is, whether the geographical location LB is located in the circular region with the geographical location LA as the origin and the preset distance as the radius). It can be seen from FIG. 6 that the geographical location LB is located in such geographical region, namely in Range_OA, and at this time the server may re-fuse the shared virtual image PA of the target object to obtain a shared virtual image PB (the scene image of the target object, the character image of the terminal A and a character image of the terminal B), and send the shared virtual image PB to the terminal A and the terminal B.

Then, at moment T1+t1+t2, yet another terminal C starts real-scene capturing at a geographical location LC, and detects the target object OA in a real-scene captured image. At this time, the terminal C may send the target object OA and the geographical location LC to the server. The server may determine that the terminal C is not the terminal which detects the target object first. Then, the server knows that the geographical location sharing range Range_OA of the target object OA is the geographical region where the geographical location LA is located. At this time, the server may determine whether the geographical location LC is located in the geographical region, namely in Range_OA (that is, whether the geographical location LC is located in the circular region with the geographical location LA as the origin and the preset distance as the radius). It can be seen from FIG. 6 that the geographical location LC is not located in such geographical region, namely not in Range_OA, the server will not process the shared virtual image PB again at this time, but send a message of acquisition request failure to the terminal C.

The above method can effectively control the number of terminals that associates with a same target object, reduce the workload of the displaying apparatus of the terminal when processing the shared virtual image, and ensure the processing efficiency.

In the virtual image displaying method provided by embodiments of the present disclosure, target object detection is performed on a real-scene captured image captured by a terminal camera to determine a real capturing direction of the terminal camera according to a position of the target object in the real-scene captured image; a virtual capturing direction of a virtual camera is calibrated according to the real capturing direction; and rendering processing is performed according to the calibrated virtual capturing direction on a shared virtual image corresponding to the target object, to superimpose and display the processed shared virtual image on the real-scene captured image. The virtual image displaying method provided in the embodiments does not require processing, such as coordinate rotation, on a virtual image per se when a display direction of the virtual image needs to be adjusted. Instead, the display direction of the virtual image when being displayed is adjusted by processing the virtual capturing direction of the virtual camera, which can be more suitable for a complex virtual image, so that the virtual image can be applied to more interactive scenarios.

Figure 7:
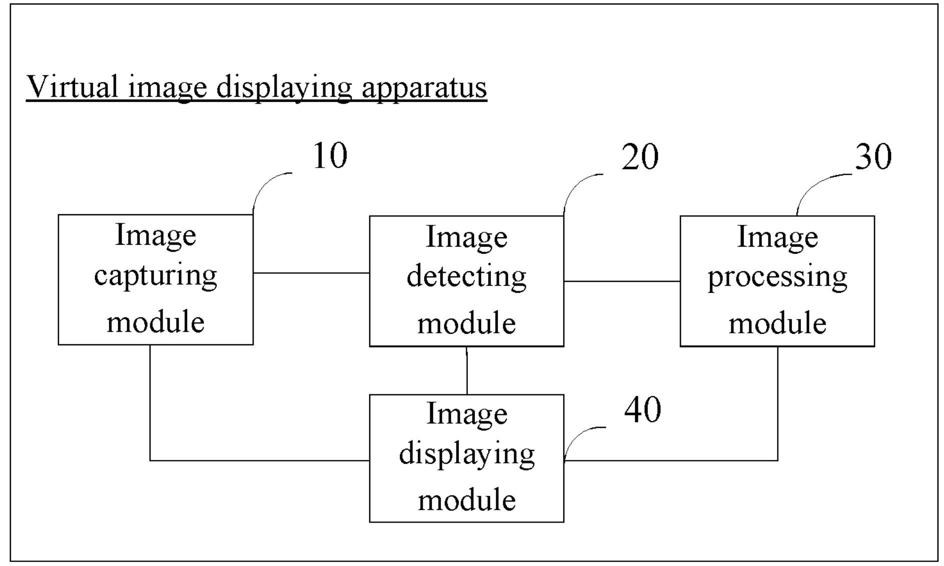
FIG. 7 is a structural block diagram of a virtual image displaying apparatus provided by an embodiment of the present disclosure.

Corresponding to the virtual image displaying method of the above embodiments, FIG. 7 is a structural block diagram of a virtual image displaying apparatus provided by an embodiment of the present disclosure. For the convenience of explanation, only parts related to embodiments of the present disclosure are shown. Referring to FIG. 7, the virtual image displaying apparatus includes an image capturing module 10, an image detecting module 20, an image processing module 30, and an image displaying module 40.

The image capturing module 10 is configured to obtain a real-scene captured image captured by a terminal camera.

The image detecting module 20 is configured to detect a target object in the real-scene captured image.

The image processing module 30 is configured to determine a real capturing direction of the terminal camera according to a position of the target object in the real-scene captured image; calibrate a virtual capturing direction of a virtual camera according to the real capturing direction; and perform rendering processing on a shared virtual image corresponding to the target object according to the calibrated virtual capturing direction.

The image displaying module 40 is configured superimpose and display the processed shared virtual image on the real-scene captured image.

In an implementation, an image acquiring module is further included; where the image acquiring module is configured to obtain the shared virtual image corresponding to the target object before the image processing module 30 performs rendering processing on the shared virtual image corresponding to the target object according to the calibrated virtual capturing direction.

In an implementation, the image processing module 30, when determining the real capturing direction of the terminal camera according to the position of the target object in the real-scene captured image, is specifically configured to determine a current phase angle of the terminal camera according to the position of the target object in the real-scene captured image, wherein the current phase angle of the terminal camera is a current phase angle of the target object relative to the terminal camera.

In an implementation, the image processing module 30, when calibrating the virtual capturing direction of the virtual camera according to the real capturing direction, is specifically configured to calibrate a phase angle of the virtual camera according to the current phase angle of the terminal camera to obtain a calibrated phase angle of the virtual camera, where the phase angle of the virtual camera is consistent with the current phase angle of the terminal camera; and perform rendering processing on the shared virtual image according to the calibrated phase angle of the virtual camera.

In an implementation, the image processing module 30, when calibrating the phase angle of the virtual camera according to the current phase angle of the terminal camera to obtain the calibrated phase angle of the virtual camera, is specifically configured to determine an offset matrix according to the current phase angle of the terminal camera; perform inverse transformation on the offset matrix to obtain an inverse transformation matrix; and perform matrix transformation on an initial phase angle of the virtual camera by using the inverse transformation matrix to obtain the calibrated phase angle of the virtual camera.

In an implementation, the image acquiring module, when obtaining the shared virtual image corresponding to the target object, is specifically configured to send, to a server, an acquisition request for the shared virtual image, the acquisition request including the detected target object, for the server to retrieve, according to the target object included in the acquisition request, a corresponding scene image and a character image preset by at least one terminal user associated with the target object; and receive the shared virtual image delivered by the server, where the shared virtual image is obtained by the server through image fusion processing on the corresponding scene image of the target object and the character image preset by the at least one terminal user associated with the target object.

In an implementation, in the received shared virtual image delivered by the server, the corresponding scene image of the target object and the character image preset by the at least one terminal user associated with the target object are established in a same virtual coordinate system.

In an implementation, the image processing module 30, when performing rendering processing on the shared virtual image corresponding to the target object according to the calibrated virtual capturing direction, is specifically configured to perform spatially rendering processing on spatial coordinates of the shared virtual image in the virtual coordinate system according to the calibrated virtual capturing direction.

In an implementation, the image acquiring module is further configured to receive an control operation triggered on a corresponding character image displayed on the real-scene captured image, and upload the control operation to the server, for the server to update the corresponding character image in the shared virtual image according to the control operation to obtain an updated shared virtual image; and receive the updated shared virtual image delivered by the server and perform rendering processing on the updated shared virtual image to superimpose and display the updated shared virtual image on the real-scene captured image.

In an implementation, the acquisition request, sent to the server, for the shared virtual image further includes a current geographical location, for the server to determine, according to a geographical location sharing range corresponding to the target object, whether the current geographical location belongs to the geographical location sharing range; if it is determined that the current geographical location belongs to the geographical location sharing range, receiving, the shared virtual image delivered by the server; otherwise, receiving, a message of acquisition request failure delivered by the server.

In an implementation, the geographical location sharing range of the target object is determined according to a geographical location of a terminal which detects the target object first.

In the virtual image displaying apparatus provided by embodiments of the present disclosure, target object detection is performed on a real-scene captured image captured by a terminal camera to determine a real capturing direction of the terminal camera according to a position of the target object in the real-scene captured image; a virtual capturing direction of a virtual camera is calibrated according to the real capturing direction; and rendering processing is performed, according to the calibrated virtual capturing direction, on a shared virtual image corresponding to the target object to superimpose and display the processed shared virtual image on the real-scene captured image. In this way, the virtual image displaying apparatus provided in the embodiments does not require processing, such as coordinate rotation, on a virtual image per se when a display direction of the virtual image needs to be adjusted. Instead, the display direction of the virtual image when being displayed is adjusted through processing the virtual capturing direction of the virtual camera, which can be more suitable for a complex virtual image, so that the virtual image can be applied to more interactive scenarios.

An electronic device provided in an embodiment may be used to implement the technical solution of the above method embodiments, and the implementation principle and technical effect thereof are similar, which will not be repeated in this embodiment.

Figure 8:
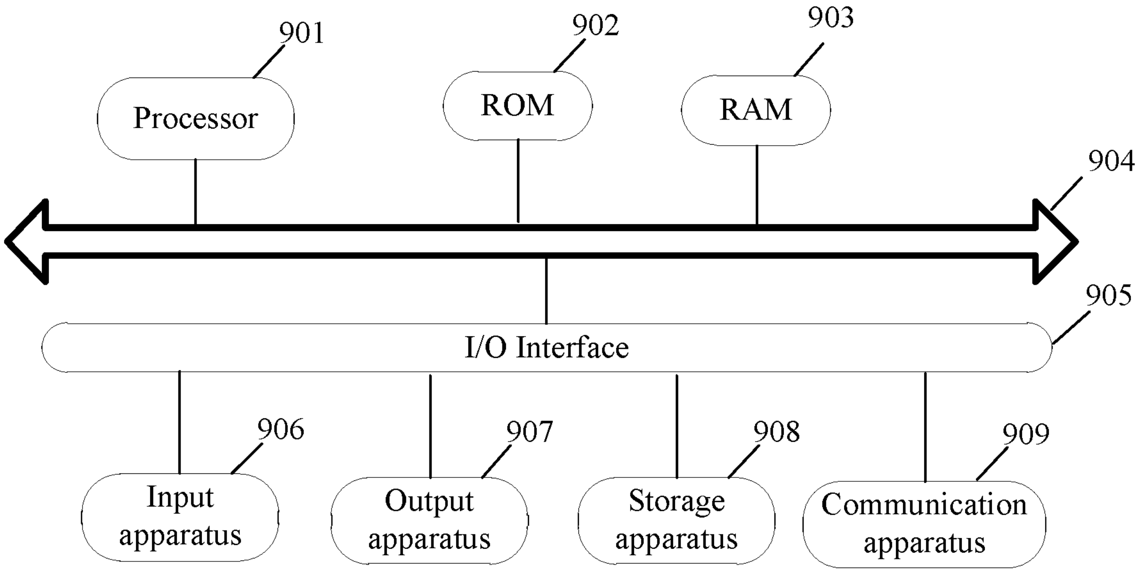
FIG. 8 is a hardware structure diagram of an electronic device provided by an embodiment of the disclosure.

Referring to FIG. 8, it shows a schematic structural diagram of the electronic device 900 suitable for implementing the embodiments of the present disclosure. The electronic device 900 may be a terminal device or a media library. The terminal device in an embodiment of the present disclosure may include, but are not limited to, mobile terminals such as a mobile phone, a notebook computer, a digital broadcast receiver, a personal digital assistant (Personal Digital Assistant, PDA), a portable android device (Portable Android Device, PAD), a portable multimedia player (Portable Media Player, PMP), a vehicle-mounted terminal (such as a vehicle navigation terminal), a wearable electronic device, and stationary terminals such as a digital TV, a desktop computer, a home automation device. The electronic device shown in FIG. 8 is only an embodiment, which should not impose any limitation on the function and applying scope of the embodiments of the present disclosure.

As shown in FIG. 8, the electronic device 900 may include a processor 901 for executing a virtual image displaying method (e.g., a central processing unit, a graphics processor, etc.), and the processor 901 may perform various appropriate actions and processing according to a program stored in a read only memory (Read only memory, ROM) 902 or a program loaded from a storage apparatus 908 into a random access memory (Random access memory, RAM) 903. Various programs and data necessary for the operation of the electronic device 900 are also stored in the RAM 903.

The processor 901, ROM 902, and RAM 903 are connected to each other through a bus 904. And an input/output (Input/output, I/O) interface 905 is also connected to the bus 904

Generally, the following apparatuses may be connected to the I/O interface 905: an input apparatus 906 including, for example, a touch screen, a touchpad, a keyboard, a mouse, a camera, a microphone, an accelerometer, a gyroscope, etc.; an output apparatus 907 including, for example, a liquid crystal display (Liquid crystal display, LCD), a speaker, a vibration, etc.; a storage apparatus 908 including, for example, a magnetic tape, a hard disk, etc.; and a communication apparatus 909. The communication apparatus 909 may allow the electronic device 900 to communicate wirelessly or by wire with other devices to exchange data. Although FIG. 8 shows the electronic device 900 having various apparatus, it should be understood that not all of the illustrated apparatuses are required to be implemented or provided. More or fewer apparatuses may alternatively be implemented or provided.

Specially, according to an embodiment of the present disclosure, the processes described above with reference to the flowcharts may be implemented as a computer software program. For example, an embodiment of the present disclosure includes a computer program product including a computer program carried on a computer-readable medium, where the computer program includes program code for performing the method illustrated in the respective flowcharts according to embodiments of the present disclosure. In such embodiment, the computer program may be downloaded and installed from a network via the communication apparatus 909, or installed from the storage apparatus 908, or installed from the ROM 902. When the computer program is executed by the processor 901, the above function defined in the embodiments of the present disclosure are implemented.

It should be noted that the computer-readable medium described in the present disclosure may be a computer-readable signal medium or a computer-readable storage medium or any combination thereof. The computer-readable storage medium may be, for example, but not limited to, an electrical, a magnetic, an optical, an electromagnetic, an infrared, or a semiconductor system, apparatus or device, or a combination thereof. More specific examples of the computer-readable storage medium may include, but are not limited to, an electrical connection with one or more wires, a portable computer disk, a hard disk, a random-access memory (RAM), a read only memory (ROM), an erasable programmable read only memory (Electrical programmable read only memory, EPROM or flash memory), an optical fiber, a portable compact disk read only memory (Compact disc read only memory, CD-ROM), an optical storage device, a magnetic storage device, or any suitable combination thereof. In the present disclosure, the computer-readable storage medium may be any tangible medium that includes or stores a program that may be used by or used in combination with an instruction execution system, apparatus, or device. And in the present disclosure, the computer-readable signal medium may include a data signal propagated in baseband or as part of a carrier wave, carrying computer-readable program code therein. Such propagated data signal may take a variety of forms, including but not limited to an electromagnetic signal, an optical signal, or any suitable combination thereof. The computer-readable signal medium may also be any computer-readable medium other than the computer-readable storage medium, and the computer-readable signal medium can transmit, propagate, or transport the program used by or used in combination with the instruction execution system, apparatus or device. The program code included on the computer-readable medium may be transmitted through any suitable medium including, but not limited to, an electrical wire, an optical fiber cable, a radio frequency (Radio Frequency, RF), etc., or any suitable combination thereof.

The computer-readable medium may be included in the electronic device; and may also exist independently without being assembled into the electronic device.

The computer-readable medium carries one or more programs, and the one or more programs, when executed by an electronic device, cause the electronic device to execute the method shown in the above embodiments.

The computer program code for performing an operation of the present disclosure may be written in one or more programming languages or a combination thereof, where the above programming languages include an object-oriented programming language, such as Java, Smalltalk, and C++, as well as a conventional procedural programming language, such as "C" or similar programming languages. The program code may be executed entirely on a user computer, executed partly on a user computer, executed as a stand-alone software package, executed partly on a user computer and partly on a remote computer, or executed entirely on a remote computer or a media library. In a case involving the remote computer, the remote computer may be connected to the user computer through any kind of network, including a local area network (Local Area Network, LAN) or a wide area network (Wide Area Network, WAN), or may be connected to an external computer (e.g., connected via the Internet using an Internet service provider).

The flowchart and block diagrams in the figures illustrate the architecture, functionality, and operation of possible implementations of systems, methods and computer program products according to various embodiments of the present disclosure. In this regard, each block in the flowchart or block diagrams may represent a module, a program segment, or a portion of code that includes one or more executable instructions for implementing a specified logical function. Furthermore, it should be noted that, in some alternative implementations, functions indicated in the blocks may occur in an order different from that indicated in the figures. For example, two blocks shown in succession may, in fact, be executed substantially concurrently, or the blocks may sometimes be executed in a reverse order, depending on the functionality involved. It should also be noted that each block of the block diagrams and/or flowcharts, or a combination of blocks in the block diagrams and/or flowcharts may be implemented with a special purpose hardware-based system that performs a specified function or operation, or may be implemented with a combination of special purpose hardware and a computer instruction.

The involved modules described in embodiments of the present disclosure may be implemented by means of software, and may also be implemented by means of hardware. Names of these modules do not constitute a limitation on the modules per se under certain circumstances.

The foregoing functions described herein may be executed, at least in part, by one or more hardware logic components. For example, without limitation, exemplary types of hardware logic components that may be used include: a field programmable gate array (Field programmable gate array, FPGA), an application specific integrated circuit (Application specific integrated circuit, ASIC), an application specific standard product (Application specific standard parts, ASSP), a system on chip (System on chip, SOC), a complex programmable logical device (Complex programmable logic device, CPLD) and more.

In the context of the present disclosure, a machine-readable medium may be a tangible medium that may contain or store a program for use by or in connection with an instruction execution system, apparatus or device. The machine-readable medium may be a machine-readable signal medium or a machine-readable storage medium. The machine-readable medium may include, but is not limited to, an electronic, a magnetic, an optical, an electromagnetic, an infrared, or a semiconductor system, apparatus, or device, or any suitable combination of the foregoing. More specific embodiments of machine-readable storage medium would include an electrical connection based on one or more wires, a portable computer disk, a hard disk, a random access memory (RAM), a read only memory (ROM), an erasable programmable read only memory (EPROM or flash memory), an optic fiber, a portable compact disk read only memory (CD-ROM), an optical storage device, a magnetic storage device, or any suitable combination of the foregoing.

The following are some embodiments of the present disclosure.

In a first aspect, according to one or more embodiments of the present disclosure, a virtual image displaying method includes:

- obtaining a real-scene captured image captured by a terminal camera;
- detecting a target object in the real-scene captured image;
- determining, according to a position of the target object in the real-scene captured image, a real capturing direction of the terminal camera;
- calibrating, according to the real capturing direction, a virtual capturing direction of a virtual camera; and
- performing, according to the calibrated virtual capturing direction, rendering processing on a shared virtual image corresponding to the target object to superimpose and display the processed shared virtual image on the real-scene captured image.

In an implementation, before the performing, according to the calibrated virtual capturing direction, rendering processing on the shared virtual image corresponding to the target object, the displaying method further includes:

- obtaining the shared virtual image corresponding to the target object.

In an implementation, the determining, according to the position of the target object in the real-scene captured image, the real capturing direction of the terminal camera includes: determining, according to the position of the target object in the real-scene captured image, a current phase angle of the terminal camera relative to the target object.

In an implementation, the calibrating, according to the real capturing direction, the virtual capturing direction of the virtual camera includes:

- calibrating, according to the current phase angle of the terminal camera, a phase angle of the virtual camera to obtain a calibrated phase angle of the virtual camera; where the phase angle of the virtual camera is consistent with the current phase angle of the terminal camera;
- the performing, according to the calibrated virtual capturing direction, rendering processing on the shared virtual image corresponding to the target object includes:
- performing, according to the calibrated phase angle of the virtual camera, rendering processing on the shared virtual image.

In an implementation, the performing, according to the current phase angle of the terminal camera, calibration on the phase angle of the virtual camera to obtain the calibrated phase angle of the virtual camera includes:

- determining, according to the current phase angle of the terminal camera, an offset matrix;
- performing, inverse transformation on the offset matrix to obtain an inverse transformation matrix; and
- performing, by using the inverse transformation matrix, matrix transformation on an initial phase angle of the virtual camera to obtain the calibrated phase angle of the virtual camera.

In an implementation, the obtaining the shared virtual image corresponding to the target object includes:

- sending, to a server, an acquisition request for the shared virtual image, the acquisition request including the detected target object, for the server to retrieve, according to the target object included in the acquisition request, a corresponding scene image and a character image preset by at least one terminal user associated with the target object; and receiving, the shared virtual image delivered by the server, where the shared virtual image is obtained by the server through image fusion processing on the corresponding scene image of the target object and the character image preset by the at least one terminal user associated with the target object.

In an implementation, in the received shared virtual image delivered by the server, the corresponding scene image of the target object and the character image preset by the at least one terminal user associated with the target object are established in a same virtual coordinate system.

In an implementation, the performing, according to the calibrated virtual capturing direction, rendering processing on the shared virtual image corresponding to the target object includes:

- performing, according to the calibrated virtual capturing direction, spatially rendering processing on spatial coordinates of the shared virtual image in the virtual coordinate system.

In an implementation, the displaying method further includes:

- receiving, a control operation triggered on a corresponding character image displayed on the real-scene captured image, and uploading the control operation to the server, for the server to update the corresponding character image in the shared virtual image according to the control operation to obtain an updated shared virtual image; and
- receiving the updated shared virtual image delivered by the server, and performing rendering processing on the updated shared virtual image, to superimpose and display the updated shared virtual image on the real-scene captured image.

In an implementation, the acquisition request, sent to the server, for the shared virtual image further includes a current geographical location, for the server to determine, according to a geographical location sharing range corresponding to the target object, whether the current geographical location belongs to the geographical location sharing range; if it is determined that the current geographical location belongs to the geographical location sharing range, receiving the shared virtual image delivered by the server; if it is determined that the current geographical location does not belong to the geographical location sharing range, receiving a message of acquisition request failure delivered by the server.

In an implementation, the geographical location sharing range of the target object is determined according to a geographical location of a terminal which detects the target object first.

In a second aspect, according to one or more embodiments of the present disclosure, a virtual image displaying apparatus includes an image capturing module, an image detecting module, an image processing module, and an image displaying module.

The image capturing module is configured to obtain a real-scene captured image captured by a terminal camera;

the image detecting module is configured to detect a target object in the real-scene captured image;

the image processing module is configured to determine a real capturing direction of the terminal camera according to a position of the target object in the real-scene captured image; calibrate a virtual capturing direction of a virtual camera according to the real capturing direction; and perform rendering processing on a shared virtual image corresponding to the target object according to the calibrated virtual capturing direction; and the image displaying module is configured to superimpose and display the processed shared virtual image on the real-scene captured image.

In an implementation, an image acquiring module is further included; where the image acquiring module is configured to obtain the shared virtual image corresponding to the target object before the image processing module performs rendering processing on the shared virtual image corresponding to the target object according to the calibrated virtual capturing direction.

In an implementation, the image processing module, when determining the real capturing direction of the terminal camera according to the position of the target object in the real-scene captured image, is specifically configured to determine, a current phase angle of the terminal camera according to the position of the target object in the real-scene captured image, wherein the current phase angle of the terminal camera is a current phase angle of the target object relative to the terminal camera.

In an implementation, the image processing module, when calibrating the virtual capturing direction of the virtual camera according to the real capturing direction, is specifically configured to calibrating a phase angle of the virtual camera according to the current phase angle of the terminal camera to obtain a calibrated phase angle of the virtual camera, where the phase angle of the virtual camera is consistent with the current phase angle of the terminal camera; and perform rendering processing on the shared virtual image according to the calibrated phase angle of the virtual camera.

In an implementation, the image processing module, when calibrating the phase angle of the virtual camera according to the current phase angle of the terminal camera to obtain the calibrated phase angle of the virtual camera, is specifically configured to determine an offset matrix according to the current phase angle of the terminal camera; perform inverse transformation on the offset matrix to obtain an inverse transformation matrix; and perform matrix transformation on an initial phase angle of the virtual camera by using the inverse transformation matrix to obtain the calibrated phase angle of the virtual camera.

In an implementation, the image acquiring module, when obtaining the shared virtual image corresponding to the target object, is specifically configured to send, to a server, an acquisition request for the shared virtual image, the acquisition request including the detected target object, for the server to retrieve, according to the target object included in the acquisition request, a corresponding scene image and a character image preset by at least one terminal user associated with the target object; and receive the shared virtual image delivered by the server, where the shared virtual image is obtained by the server through image fusion processing on the corresponding scene image of the target object and the character image preset by the at least one terminal user associated with the target object.

In an implementation, in the received shared virtual image delivered by the server, the corresponding scene image of the target object and the character image preset by the at least one terminal user associated with the target object are established in a same virtual coordinate system.

In an implementation, the image processing module, when performing rendering processing on the shared virtual image corresponding to the target object according to the calibrated virtual capturing direction, is specifically configured to perform spatially rendering processing on spatial coordinates of the shared virtual image in the virtual coordinate system according to the calibrated virtual capturing direction.

In an implementation, the image acquiring module is further configured to receive a control operation triggered on a corresponding character image displayed on the real-scene captured image, and upload the control operation to the server, for the server to update the corresponding character image in the shared virtual image according to the control operation to obtain an updated shared virtual image; and receive the updated shared virtual image delivered by the server and perform rendering processing on the updated shared virtual image to superimpose and display the updated shared virtual image on the real-scene captured image.

In an implementation, the acquisition request, sent to the server, for the shared virtual image further includes a current geographical location, for the server to determine, according to a geographical location sharing range corresponding to the target object, whether the current geographical location belongs to the geographical location sharing range; if it is determined that the current geographical location belongs to the geographical location sharing range, the shared virtual image delivered by the server is received; if it is determined that the current geographical location does not belong to the geographical location sharing range, a message of acquisition request failure delivered by the server is received.

In an implementation, the geographical location sharing range of the target object is determined according to a geographical location of a terminal that detects the target object first.

In a third aspect, according to one or more embodiments of the present disclosure, an electronic device includes: at least one processor and a memory;

where the memory stores a computer execution instruction; and the at least one processor executes the computer execution instruction stored in the memory, to cause the at least one processor to implement the virtual image displaying method as described in any of the above.

In a fourth aspect, according to one or more embodiments of the present disclosure, a computer-readable storage medium has a computer execution instruction stored thereon, where a processor implements the virtual image displaying method as described in any one of the above when executing the computer execution instruction.

In a fifth aspect, according to one or more embodiments of the present disclosure, a computer program product includes a computer program, and when the computer program is executed by a processor, the virtual image displaying method as described in any one of the above is implemented.

In a sixth aspect, according to one or more embodiments of the present disclosure, when a computer program is executed by a processor, the virtual image displaying method as described in any one of the above is implemented.

The above descriptions are merely preferred embodiments of the present disclosure and illustrations of applied technical principles. The person skilled in the art should understand that a disclosure scope involved in the present disclosure is not limited to the technical solution formed by the specific combination of the above-mentioned technical features, and should also cover other technical solutions formed by any combination of the above technical features or their equivalents without departing from the above disclosure concept, for example, a technical solution formed by replacing the above features with the technical features with similar functions disclosed in the present disclosure (but not limited to).

In addition, although operations are depicted in a particular order, it should not be understood as requiring these operations to be performed in the specific order shown or in the sequential order. Under a certain circumstance, multitasking and parallel processing may be advantageous. Likewise, although the above discussion contains several implementation-specific details, these should not be interpreted as limiting the scope of the present disclosure. Certain features described in the context of individual embodiments may also be implemented in combination in a single embodiment. Conversely, various features described in the context of a single embodiment may also be implemented in multiple embodiments individually or in any suitable sub-combination.

Although the subject matter has been described in a language specific to a structural feature and/or a methodological action, it should be understood that the subject matter defined in the appended claims is not necessarily limited to the specific features or actions described above. On the contrary, the specific features and actions described above are merely embodiment forms for implementing the claims.

What is claimed is:

1. A virtual image displaying method, applied in a terminal, comprising:

obtaining a real-scene captured image captured by a terminal camera;

detecting a target object in the real-scene captured image;

determining, according to a position of the target object in the real-scene captured image, a real capturing direction of the terminal camera;

calibrating, according to the real capturing direction, a virtual capturing direction of a virtual camera;

obtaining a shared virtual image corresponding to the target object from a server; and performing, according to the calibrated virtual capturing direction, rendering processing on the shared virtual image corresponding to the target object, to superimpose and display the processed shared virtual image on the real-scene captured image;

wherein the determining, according to the position of the target object in the real-scene captured image, the real capturing direction of the terminal camera comprises:

determining a depth of field of the target object in the real-scene captured image, wherein the depth of field is used to represent a distance of the target object relative to the terminal camera;

determining, according to the depth of field and the position of the target object in the real-scene captured image, a direction of the target object relative to the terminal camera; and determining a current phase angle of the terminal camera, wherein the current phase angle of the terminal camera represents the distance of the target object relative to the terminal camera and the direction of the target object relative to the terminal camera;

wherein the obtaining the shared virtual image corresponding to the target object from the server comprises:

sending, to the server, an acquisition request for the shared virtual image, the acquisition request comprising the detected target object, for the server to retrieve, according to the target object comprised in the acquisition request, a corresponding scene image and a character image preset by at least one terminal user associated with the target object, wherein the at least one terminal user associated with the target object is a terminal user within a circular area with a geographical location of the target object as an origin and a preset distance as a radius, and the character image preset by the at least one terminal user is a character image established by the at least one terminal user prior to detecting the target object to reflect a user personality of the at least one terminal user; and receiving, the shared virtual image delivered by the server, wherein the shared virtual image is obtained by the server through image fusion processing on the corresponding scene image of the target object and the character image preset by the at least one terminal user associated with the target object.

2. The displaying method according to claim 1, wherein the calibrating, according to the real capturing direction, the virtual capturing direction of the virtual camera comprises:

calibrating, according to the current phase angle of the terminal camera, a phase angle of the virtual camera to obtain a calibrated phase angle of the virtual camera; wherein the calibrated phase angle of the virtual camera is consistent with the current phase angle of the terminal camera;

the performing, according to the calibrated virtual capturing direction, rendering processing on the shared virtual image corresponding to the target object comprises:

performing, according to the calibrated phase angle of the virtual camera, rendering processing on the shared virtual image.

3. The displaying method according to claim 2, wherein the calibrating, according to the current phase angle of the terminal camera, the phase angle of the virtual camera to obtain the calibrated phase angle of the virtual camera comprises:

determining, according to the current phase angle of the terminal camera, an offset matrix;

performing inverse transformation on the offset matrix to obtain an inverse transformation matrix; and performing, by using the inverse transformation matrix, matrix transformation on an initial phase angle of the virtual camera to obtain the calibrated phase angle of the virtual camera.

4. The displaying method according to claim 1, wherein in the received shared virtual image delivered by the server, the corresponding scene image of the target object and the character image preset by the at least one terminal user associated with the target object are established in a same virtual coordinate system.

5. The displaying method according to claim 4, wherein the performing, according to the calibrated virtual capturing direction, rendering processing on the shared virtual image corresponding to the target object comprises:

performing, according to the calibrated virtual capturing direction, spatially rendering processing on spatial coordinates of the shared virtual image in the virtual coordinate system.

6. The displaying method according to claim 1, wherein the displaying method further comprises:

receiving, a control operation triggered on a corresponding character image displayed in the real-scene captured image, and uploading the control operation to the server, for the server to update the corresponding character image in the shared virtual image according to the control operation to obtain an updated shared virtual image; and receiving, the updated shared virtual image delivered by the server, and performing rendering processing on the updated shared virtual image to superimpose and display the updated shared virtual image on the real-scene captured image.

7. The displaying method according to claim 1, wherein the acquisition request, sent to the server, for the shared virtual image further comprises a current geographical location, for the server to determine, according to a geographical location sharing range corresponding to the target object, whether the current geographical location belongs to the geographical location sharing range;

if it is determined that the current geographical location belongs to the geographical location sharing range, receiving the shared virtual image delivered by the server; if it is determined that the current geographical location does not belong to the geographical location sharing range, receiving a message of acquisition request failure delivered by the server.

8. The displaying method according to claim 7, wherein the geographical location sharing range corresponding to the target object is determined according to a geographical location of a terminal which detects the target object first.

9. An electronic device, comprising:

at least one processor; and a memory;

wherein the memory stores a computer execution instruction;

when the at least one processor executes the computer execution instruction stored in the memory, the one or more processors are caused to:

obtain a real-scene captured image captured by a terminal camera;

detect a target object in the real-scene captured image;

determine a real capturing direction of the terminal camera according to a position of the target object in the real-scene captured image; calibrate a virtual capturing direction of a virtual camera according to the real capturing direction; obtain a shared virtual image corresponding to the target object from a server; and perform rendering processing on the shared virtual image corresponding to the target object according to the calibrated virtual capturing direction; and superimpose and display the processed shared virtual image on the real-scene captured image;

wherein the one or more processors are caused to:

determine a depth of field of the target object in the real-scene captured image, wherein the depth of field is used to represent a distance of the target object relative to the terminal camera;

determine, according to the depth of field and the position of the target object in the real-scene captured image, a direction of the target object relative to the terminal camera; and determine a current phase angle of the terminal camera, wherein the current phase angle of the terminal camera represents the distance of the target object relative to the terminal camera and the direction of the target object relative to the terminal camera;

wherein the one or more processors are caused to:

send, to the server, an acquisition request for the shared virtual image, the acquisition request comprising the detected target object, for the server to retrieve, according to the target object comprised in the acquisition request, a corresponding scene image and a character image preset by at least one terminal user associated with the target object, wherein the at least one terminal user associated with the target object is a terminal user within a circular area with a geographical location of the target object as an origin and a preset distance as a radius, and the character image preset by the at least one terminal user is a character image established by the at least one terminal user prior to detecting the target object to reflect a user personality of the at least one terminal user; and receive the shared virtual image delivered by the server, wherein the shared virtual image is obtained by the server through image fusion processing on the corresponding scene image of the target object and the character image preset by the at least one terminal user associated with the target object.

10. The electronic device according to claim 9, wherein the one or more processors are caused to:

calibrate a phase angle of the virtual camera to obtain a calibrated phase angle of the virtual camera according to the current phase angle of the terminal camera; wherein the calibrated phase angle of the virtual camera is consistent with the current phase angle of the terminal camera; and perform rendering processing on the shared virtual image according to the calibrated phase angle of the virtual camera.

11. The electronic device according to claim 10, wherein the one or more processors are caused to:

determine an offset matrix according to the current phase angle of the terminal camera;

performing inverse transformation on the offset matrix to obtain an inverse transformation matrix; and perform matrix transformation on an initial phase angle of the virtual camera to obtain the calibrated phase angle of the virtual camera by using the inverse transformation matrix.

12. The electronic device according to claim 9, wherein in the received shared virtual image delivered by the server, the corresponding scene image of the target object and the character image preset by the at least one terminal user associated with the target object are established in a same virtual coordinate system.

13. The electronic device according to claim 12, wherein the one or more processors are caused to:

perform spatially rendering processing on spatial coordinates of the shared virtual image in the virtual coordinate system according to the calibrated virtual capturing direction.

14. A non-transitory computer-readable storage medium having a computer execution instruction stored thereon, wherein when the computer execution instruction is executed by a processor, the processor is caused to:

obtain a real-scene captured image captured by a terminal camera;

detect a target object in the real-scene captured image;

determine a real capturing direction of the terminal camera according to a position of the target object in the real-scene captured image; calibrate a virtual capturing direction of a virtual camera according to the real capturing direction; obtain a shared virtual image corresponding to the target object from a server; and perform rendering processing on the shared virtual image corresponding to the target object according to the calibrated virtual capturing direction; and superimpose and display the processed shared virtual image on the real-scene captured image;

wherein the one or more processors are caused to:

determine a depth of field of the target object in the real-scene captured image, wherein the depth of field is used to represent a distance of the target object relative to the terminal camera;

determine, according to the depth of field and the position of the target object in the real-scene captured image, a direction of the target object relative to the terminal camera; and determine a current phase angle of the terminal camera, wherein the current phase angle of the terminal camera represents the distance of the target object relative to the terminal camera and the direction of the target object relative to the terminal camera;

wherein the one or more processors are caused to:

send, to the server, an acquisition request for the shared virtual image, the acquisition request comprising the detected target object, for the server to retrieve, according to the target object comprised in the acquisition request, a corresponding scene image and a character image preset by at least one terminal user associated with the target object, wherein the at least one terminal user associated with the target object is a terminal user within a circular area with a geographical location of the target object as an origin and a preset distance as a radius, and the character image preset by the at least one terminal user is a character image established by the at least one terminal user prior to detecting the target object to reflect a user personality of the at least one terminal user; and receive the shared virtual image delivered by the server, wherein the shared virtual image is obtained by the server through image fusion processing on the corresponding scene image of the target object and the character image preset by the at least one terminal user associated with the target object.

* * * * *